United States Patent
Kim et al.

(10) Patent No.: US 9,111,129 B2
(45) Date of Patent: Aug. 18, 2015

(54) SUBJECT DETECTING METHOD AND APPARATUS, AND DIGITAL PHOTOGRAPHING APPARATUS

(75) Inventors: Jong-sun Kim, Suwon-si (KR); Won-seok Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 13/599,120

(22) Filed: Aug. 30, 2012

(65) Prior Publication Data

US 2013/0120635 A1    May 16, 2013

(30) Foreign Application Priority Data

Nov. 15, 2011    (KR) ........................ 10-2011-0119127

(51) Int. Cl.
*H04N 5/232* (2006.01)
*G06K 9/00* (2006.01)
*G06K 9/32* (2006.01)

(52) U.S. Cl.
CPC .......... *G06K 9/00221* (2013.01); *G06K 9/3208* (2013.01); *H04N 5/23219* (2013.01); *H04N 5/23293* (2013.01); *G09G 2340/0492* (2013.01)

(58) Field of Classification Search
CPC .......... H04N 5/23219; H04N 5/23293; G06K 9/00221; G06K 9/00228
USPC ............ 348/333.01, 333.02, 333.06, 333.11, 348/333.12
See application file for complete search history.

(56) References Cited

U.S. PATENT DOCUMENTS

| | | | |
|---|---|---|---|
| 6,518,956 B1 * | 2/2003 | Sato | 345/173 |
| 6,597,817 B1 * | 7/2003 | Silverbrook | 382/289 |
| 2005/0041130 A1 * | 2/2005 | Yoon et al. | 348/333.01 |
| 2008/0225156 A1 * | 9/2008 | Kim | 348/333.06 |
| 2009/0202180 A1 * | 8/2009 | Ericson | 382/313 |
| 2010/0316254 A1 * | 12/2010 | Kirsch et al. | 382/103 |
| 2011/0158537 A1 * | 6/2011 | Uno | 382/190 |
| 2012/0081576 A1 * | 4/2012 | Seo et al. | 348/231.6 |
| 2012/0176508 A1 * | 7/2012 | Jeong | 348/231.2 |
| 2012/0294533 A1 * | 11/2012 | Ikenoue | 382/195 |
| 2013/0050557 A1 * | 2/2013 | Moriyasu | 348/333.06 |
| 2013/0120635 A1 * | 5/2013 | Kim et al. | 348/333.06 |
| 2013/0250158 A1 * | 9/2013 | Yamauchi | 348/333.06 |

* cited by examiner

*Primary Examiner* — Timothy J Henn
(74) *Attorney, Agent, or Firm* — Drinker Biddle & Reath LLP (57) ABSTRACT

A subject detecting method and a subject detecting apparatus, by which face detection may be efficiently performed in a digital photographing apparatus having a flippable display unit, and when an image input via an image sensor of the digital photographing apparatus is different from an image displayed on the display unit due to rotation of the digital photographing apparatus, a face detection coordinate may be corrected to increase the reliability of face detection.

22 Claims, 11 Drawing Sheets

SUBJECT DETECTING METHOD AND APPARATUS, AND DIGITAL PHOTOGRAPHING APPARATUS

CROSS-REFERENCE TO RELATED PATENT APPLICATION

This application claims the priority benefit of Korean Patent Application No. 10-2011-0119127, filed on Nov. 15, 2011, in the Korean Intellectual Property Office, which is incorporated herein in its entirety by reference.

BACKGROUND

1. Field of the Invention

The invention relates to a subject detecting method and apparatus, and a digital photographing apparatus.

2. Description of the Related Art

Most digital cameras that have been recently released provide a subject detection function or a face detection function. Since face detection is usually based on learning of face data, a face region is detected by searching for learned face data in an image input via an image sensor.

In addition, since most digital cameras include a display device such as a liquid crystal display (LCD) window, a subject to be photographed may be displayed on the LCD window to facilitate a photographing operation. Moreover, recent digital cameras improve the convenience of photographing by allowing the angle of the LCD window to be changed. For example, because an LCD window, which is disposed on a side of a digital camera opposite to a side where lenses are located, is rotatably coupled to the main body of the digital camera, a user desiring to take a picture of themselves may rotate the LCD window to check his or her own image through the LCD window before taking a picture.

SUMMARY

An embodiment of the invention provides a subject detecting method and apparatus in which face detection may be efficiently performed in a digital photographing apparatus having a rotatable display unit and in which, when an image input via an image sensor of the digital photographing apparatus is different from an image displayed on a display unit due to rotation of the digital photographing apparatus, a face detection coordinate may be corrected to increase the reliability of face detection.

According to an aspect of the invention, there is provided a subject detecting method comprising: displaying an input image on a display unit; and detecting a subject from the input image according to a rotation state of the input image and a display state of the input image.

The display state may denote a state in which the input image is displayed to face the subject.

The rotation state of the input image may comprise one of substantially 0 degrees, substantially 90 degrees, or substantially 180 degrees.

A coordinate of a subject included in an input image displayed on the display unit may not be consistent with a coordinate of the detected subject.

When the display unit has been flipped and the input image is rotated substantially 0 degrees from a reference angle, the subject detecting method may further comprise: vertically inverting a coordinate of the detected subject; and displaying a subject detection frame indicating the detected subject so that the subject detection frame conforms to the vertically inverted coordinate of the detected subject.

The input image may be rotated in a direction reverse to the rotation direction according to the rotation state of the input image.

When the display unit has been flipped and the input image is rotated clockwise by substantially 90 degrees from the reference angle, the subject detecting method may further comprise: rotating the input image substantially 90 degrees counter-clockwise; detecting the subject from the rotated input image; horizontally inverting a coordinate of the subject; and displaying a subject detection frame indicating the detected subject so that the subject detection frame conforms to the horizontally inverted coordinate of the subject.

When the display unit has been flipped and the input image is rotated counter clockwise by substantially 90 degrees from the reference angle, the subject detecting method may further comprise: rotating the input image substantially 90 degrees clockwise; detecting the subject from the rotated input image; horizontally inverting a coordinate of the subject; and displaying a subject detection frame indicating the detected subject so that the subject detection frame conforms to the horizontally inverted coordinate of the subject.

When the display unit has been flipped and the input image is rotated substantially 180 degrees from the reference angle, the subject detecting method may further comprise: rotating the input image substantially 180 degrees; detecting the subject from the rotated input image; vertically inverting a coordinate of the detected subject; and displaying a subject detection frame indicating the detected subject so that the subject detection frame conforms to the vertically inverted coordinate of the detected subject.

The subject may be a face.

According to another aspect of the invention, there is provided a subject detecting method comprising: displaying an input image on a display unit; and detecting a subject from the input image, wherein a coordinate of a subject included in an input image displayed on the display unit is not consistent with a coordinate of the detected subject.

According to another aspect of the invention, there is provided a subject detecting apparatus comprising: a display unit which displays an input image; and a subject detection unit which detects a subject from the input image according to a rotation state of the input image and a display state of the input image.

The display state may denote a state in which the input image is displayed to face the subject.

A coordinate of a subject included in an input image displayed on the display unit may not be consistent with a coordinate of the detected subject.

When the display unit has been flipped and the input image is rotated substantially 0 degrees from a reference angle, the subject detecting apparatus may further comprise: a detection coordinate transformation unit which vertically inverts a coordinate of the detected subject; and a detection frame display controller which displays a subject detection frame indicating the detected subject so that the subject detection frame conforms to the vertically inverted coordinate of the detected subject.

The subject detecting apparatus may further comprise: a sensor unit which senses the rotation state of the input image and the display state of the input image; and an image transformation unit which rotates the input image in a direction reverse to the rotation direction according to the sensed rotation state of the input image.

The subject may be a face.

According to another aspect of the invention, there is provided a digital photographing apparatus comprising: an image pickup device which receives light from a subject to be photographed to produce an input image; a display screen which displays the input image; a sensor unit which senses a rotation state of the input image and a rotation state of the display screen; and a digital signal processor which detects the subject according to a rotation state of the input image and a display state of the input image, and displays a subject detection frame indicating the detected subject on the display screen.

The display screen may be configured to be flipped to face the subject.

The rotation state of the input image may comprise one of substantially 0 degrees, substantially 90 degrees, or substantially 180 degrees.

A coordinate of the subject that is included in the input image and displayed on the display screen may not be consistent with a coordinate of the detected subject.

The sensor unit may comprise: an acceleration sensor which senses the rotation state of the input image; and a Hall sensor which senses the rotation state of the display screen.

According to another aspect of the invention, there is provided a non-transitory computer-readable recording medium having recorded thereon a program for executing at least a subject detecting method.

BRIEF DESCRIPTION OF THE DRAWINGS

The above and other features and advantages of the invention will become more apparent by reviewing detail exemplary embodiments thereof with reference to the attached drawings, in which.

DETAILED DESCRIPTION

The invention will be described more fully with reference to the accompanying drawings, in which illustrative embodiments of the invention are shown. This invention, however, should not be construed as limited to the embodiments set forth herein; rather, these embodiments are provided so that this disclosure will be thorough and complete, and will fully convey the scope of the invention to those skilled in the art.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, components, and/or groups thereof, but do not preclude the presence or addition of one or more other features, regions, integers, steps, operations, elements, components, and/or groups thereof.

Hereinafter, the invention will be described in detail by explaining exemplary embodiments of the invention with reference to the attached drawings. Like reference numerals in the drawings denote like elements. Expressions such as "at least one of," when preceding a list of elements, modify the entire list of elements and do not modify the individual elements of the list.

Figure 1:
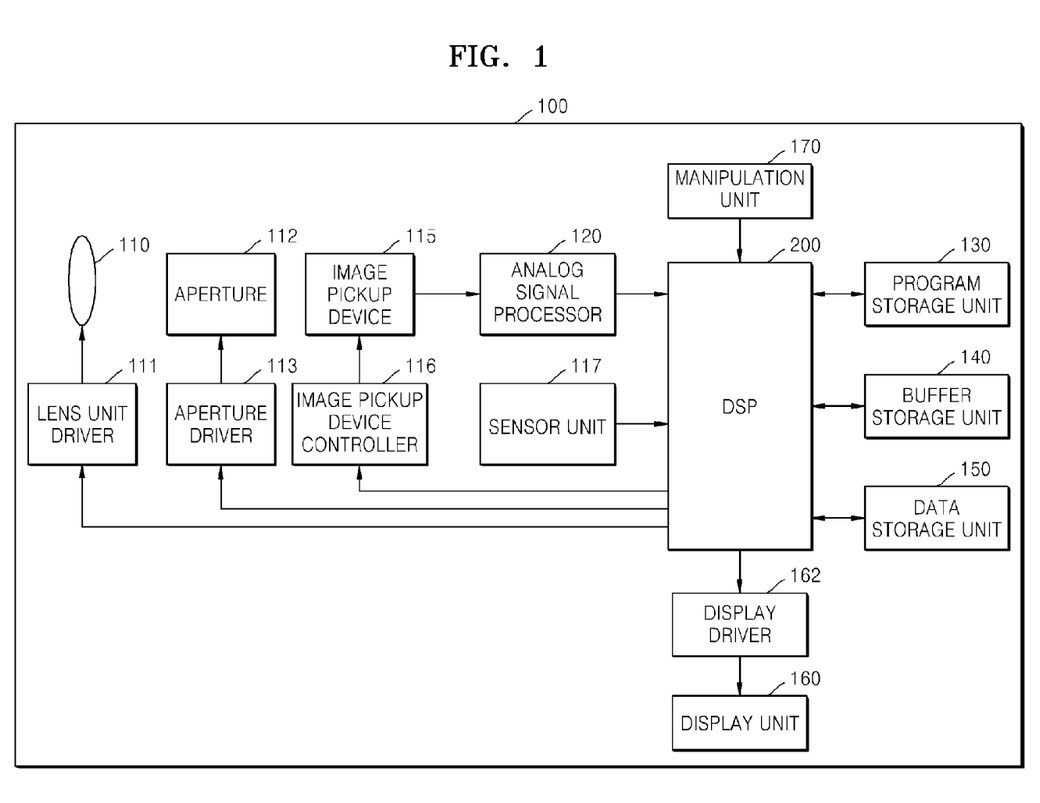
FIG. 1 is a schematic block diagram showing a digital camera as an example of a digital photographing apparatus, according to an embodiment of the invention.

FIG. 1 is a schematic block diagram showing a digital camera 100 as an example of a digital photographing apparatus, according to an embodiment of the invention.

The digital camera 100 is described below as an example of a digital photographing apparatus, according to an embodiment of the invention. However, the digital photographing apparatus is not limited to the digital camera 100 of FIG. 1 and may be any of other digital apparatuses such as a camera phone, a personal digital assistant (PDA), a portable multimedia player (PMP), a camcorder, or any other digital apparatus capable of detecting subjects during photography.

The digital camera 100 according to the present embodiment may include a lens unit 110, a lens unit driver 111, an aperture 112, an aperture driver 113, an image pickup device 115, an image pickup device controller 116, an analog signal processor 120, a program storage unit 130, a buffer storage unit 140, a data storage unit 150, a display driver 162, a display unit 160, a digital signal processor (DSP) 200, and a manipulation unit 170. The lens unit 110, the lens unit driver 111, the aperture 112, the aperture driving unit 113, the image pickup device 115, the image pickup device controller 116, and the analog signal processor 120 may be referred to a photographing unit.

The lens unit 110 focuses an optical signal. The lens unit 110 includes a zoom lens for controlling a viewing angle to be increased or decreased according to a focal length, and a focus lens for adjusting a focus of an object. The zoom lens and the focus lens each may be formed of a single lens or a group of lenses. Here, the zoom lens may be formed of a plurality of lens groups that have plus and minus refractive powers. For example, the zoom lens may be formed of a first lens group having a plus refractive power, a second lens group having a minus refractive power, and a third lens group having a plus refractive power, and a fourth lens group having a plus refractive power that are sequentially disposed from an object side. Accordingly, the zoom lens may change a viewing angle by adjusting a position of each lens group under the drive control of the lens unit driver 111. That is, the lens unit driver 111 may move the zoom lens from a wide-angle end to a telephoto end to perform a zoom-in operation, or from a telephoto end to a wide-angle end to perform a zoom-out operation. The aperture 112 adjusts an amount of incident light according to a degree of opening thereof.

The lens unit driver 111 and the aperture driving unit 113 receive control signals from the DSP 200, and respectively drive the lens unit 110 and the aperture 112. The lens unit driver 111 adjusts the focal length by controlling a position of a lens to perform operations of auto-focusing, zoom change, and focus change. The aperture driving unit 113 adjusts the degree of opening of the aperture 112, in particular, adjusts an f number or a value of the aperture 112 to perform operations of auto-focusing, auto-exposure correction, focus change, and adjustment of depth of field.

An optical signal passing through the lens unit 110 forms an image of a subject on a light receiving surface of the image pickup device 115. The image pickup device 115 may use a charge coupled device (CCD), a complementary metal oxide semiconductor image sensor (CIS), or a high speed image sensor for converting an optical signal to an electric signal. A sensitivity of the image pickup device 115 may be adjusted by the image pickup device controller 116. The image pickup device controller 116 may control the image pickup device 115 according to a control signal that is automatically generated by an image signal that is input in real time, or a control signal that is manually input by an operation of a user. An exposure time of the image pickup device 115 is adjusted by a shutter (not shown). The shutter may be a mechanical shutter for adjusting incidence of light by moving a blind, or an electronic shutter for controlling exposure by applying an electric signal to the image pickup device 115.

A communication unit (not shown) may transmit an input image or a live view image to another external mobile device such as, for example, a smart phone or a portable terminal, under the control of the DSP 200 to allow the external mobile device to display other photographing conditions including the input image that are to be displayed on the digital camera 100. The communication unit communicates with the external mobile device according to a predetermined wired or wireless Internet protocol such as, for example, wireless fidelity (Wi-Fi)

The analog signal processor 120 performs noise reduction processing, gain control, waveform standardization, and analog-digital conversion processing on an analog signal applied by the image pickup device 115.

The manipulation unit 170 is used to input an external control signal by, for example, a user. The manipulation unit 170 may include a shutter-release button for inputting a shutter-release signal for capturing an image by exposing the image pickup device 115 to light for a predetermined period of time, a power button for inputting a control signal for controlling on/off of power, a wide zoom button and a tele-zoom button for increasing or decreasing a viewing angle according to an input, and a variety of function buttons for selecting a mode such as a text input mode, a photographing mode, a reproduction mode, a white balance setting mode, or an exposure setting mode. The manipulation unit 170 may have a variety of types of buttons as above, but the invention is not limited thereto. For example, the manipulation unit 170 may be embodied in any type such as a keyboard, a touch pad, a touch screen, or a remote controller, to be used by a user to input data.

The digital camera 100 includes the program storage unit 130 for storing a program such as an operating system for controlling the digital camera 100 or an application system, the buffer storage unit 140 for temporarily storing data needed for performing an operation or resultant data, and the data storage unit 150 for storing various information needed for the program, such as an image file having an image signal.

Figure 5:
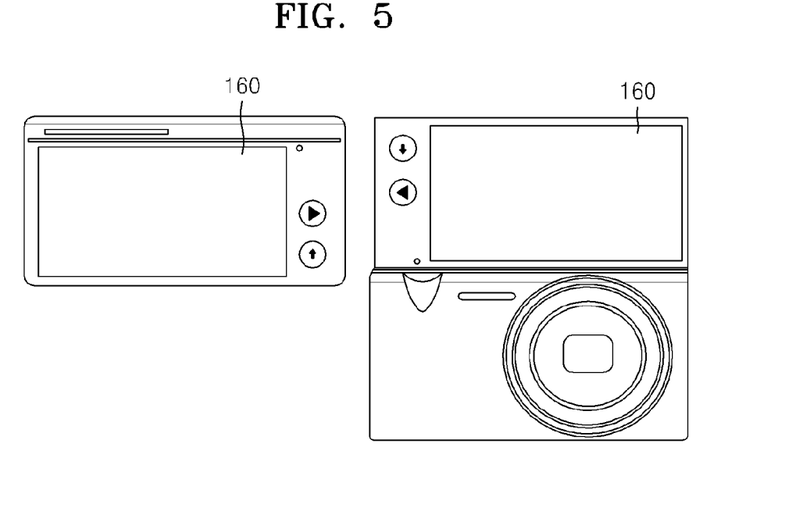
FIG. 5 illustrates flipping of a display screen of the digital camera shown in FIG. 1.

The digital camera 100 includes the display unit 160 for displaying an operation state of the digital camera or still image data or moving picture data captured by the digital camera 100. The display unit 160 may provide visual information and acoustic information to a user. To provide visual information, the display unit 160 may include, for example, a liquid crystal display panel (LCD) or an organic light emitting display panel (OLED). The display driving unit 162 provides a driving signal to the display unit 160. The display unit 160 according to the invention is disposable in a position facing a subject to be photographed. For example, the display unit 160 may be configured to be disposed on a front surface of the digital camera 100, that is, a surface on which a lens is disposed, or on a rear surface of the digital camera 100 and adjusted, rotated, flipped upward or otherwise positioned to face the subject to be photographed. FIG. 5 illustrates a digital camera including a display unit according to an embodiment of the invention that can be flipped upward. As illustrated in the left side of FIG. 5, the display unit 160 is initially positioned on the rear side of the digital camera and can be flipped upward through a manipulation or the like of a user. Thus, the display unit 160 can be positioned to face the subject to be photographed.

Referring to FIG. 1, a sensor unit 117 includes an acceleration sensor that senses rotation states of the digital camera 100, for example, a reference angle which is 0 degrees, a clockwise rotation, a counter-clockwise rotation, and a 180-degree rotation.

Figure 6:
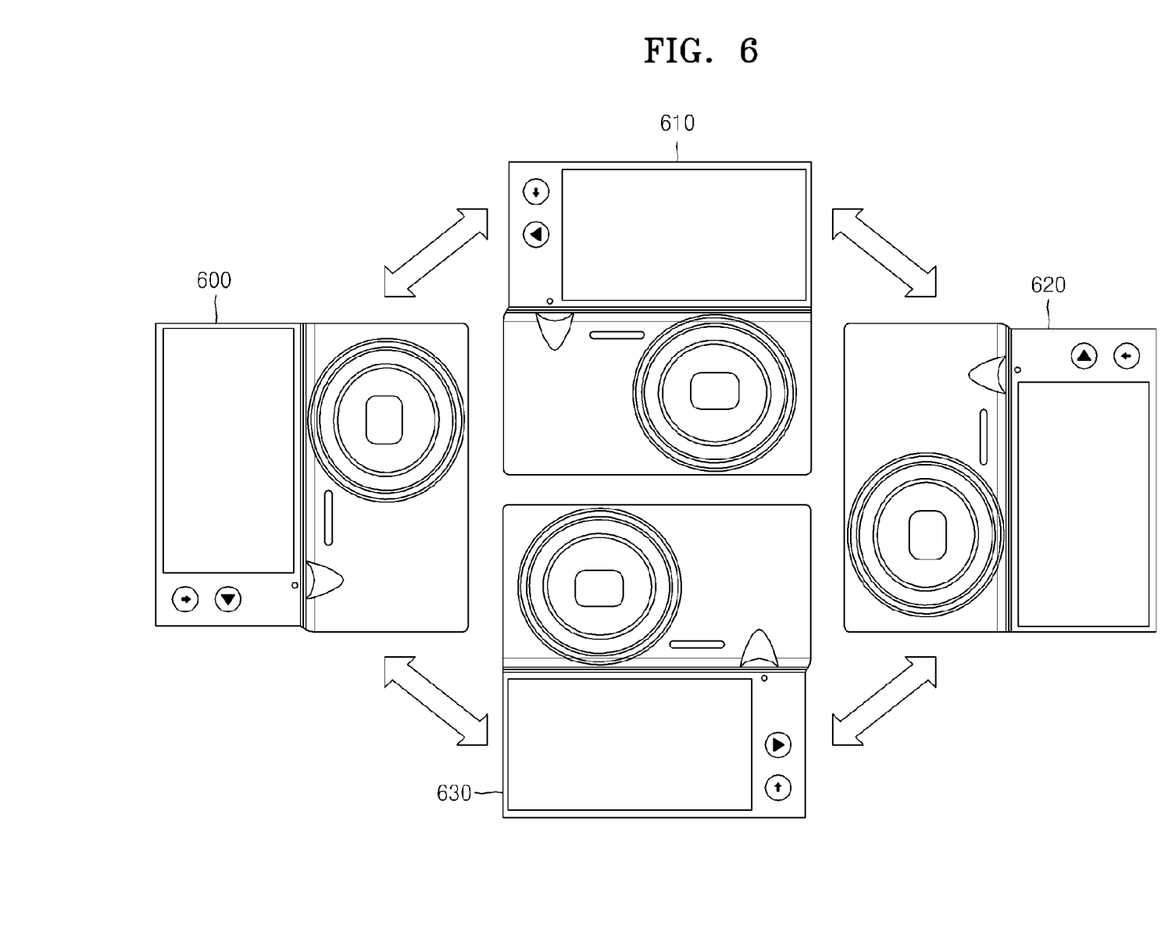
FIG. 6 illustrates rotation of the digital camera of FIG. 1 of which the display screen has been flipped.

Referring to FIG. 6, a 0-degree state 610, which is a reference angle state, a state 620 where 90-degree rotation occurs clockwise, a state 630 where 180-degree rotation occurs, and a state 600 where 90-degree rotation occurs counter clockwise after the display unit 160 of FIG. 5 has been flipped upward are illustrated. The acceleration sensor of the sensor unit 117 senses an angle range that varies according to the rotation directions illustrated in FIG. 6. The acceleration sensor includes a fixed conductor and a movable conductor. When the acceleration sensor moves in one direction, the acceleration sensor may sense a change occurring within the range of a gravity acceleration (g) to generate data, and may calculate an inclined angle using the data. Angles used by the DSP 200 from among angles received from the acceleration sensor are clockwise 90 degrees, clockwise 180 degrees, counter clockwise 90 degrees, and counter clockwise 180 degrees. The display unit 160 displays an image in accordance with the inclined angles. In other words, when the display unit 160 is rotated at each angle, an input image displayed on the display unit 610 is rotated according to the rotation of the display unit 160 and then displayed.

The sensor unit 117 also includes a Hall sensor that senses a flipped state of the display unit 160. As illustrated in FIG. 5, when the display unit 160 is flipped, the sensor unit 117 senses the flipped state and provides information corresponding to the flipped state to the DSP 200. The Hall sensor varies its output voltage in response to a change in magnetic field when the display unit 160 is flipped, and the DSP 200 determines whether the display unit 160 is flipped using the varied Hall sensor's output voltage.

The digital camera 100 includes the DSP 200, which processes input image signals and controls each element according to a processed input image signal or an external input signal. The DSP 200 may reduce noise of input image data and perform image signal processing for improving image quality, such as gamma correction, color filter array interpolation, color matrix, color correction, or color enhancement. Also, the DSP 200 may generate an image file by compressing image data generated by performing the image signal processing for improving image quality, or restore image data from an image file. An image compression format may be a reversible format or an irreversible format. Compressed data may be stored in the data storage unit 150. Also, the DSP 200 may perform sharpness processing, color processing, blur processing, edge emphasis processing, image interpretation processing, image recognition processing, image effect processing, or the like. Face recognition or scene recognition processing may be performed as the image recognition processing. Luminance level control, color correction, contrast control, contour emphasis control, screen division processing, or character image generation and synthesis processing may also be performed.

Also, the DSP 200 may generate a control signal to control auto-focusing, zoom change, focus change, or auto-exposure correction by executing a program stored in the program storage unit 130 or using a separate module, and provide a generated control signal to the lens unit driver 111, the aperture driving unit 113, and the image pickup device controller 116, so that operations of elements, such as a shutter or a flash, provided in the digital camera 100 may be generally controlled.

Figure 4A:
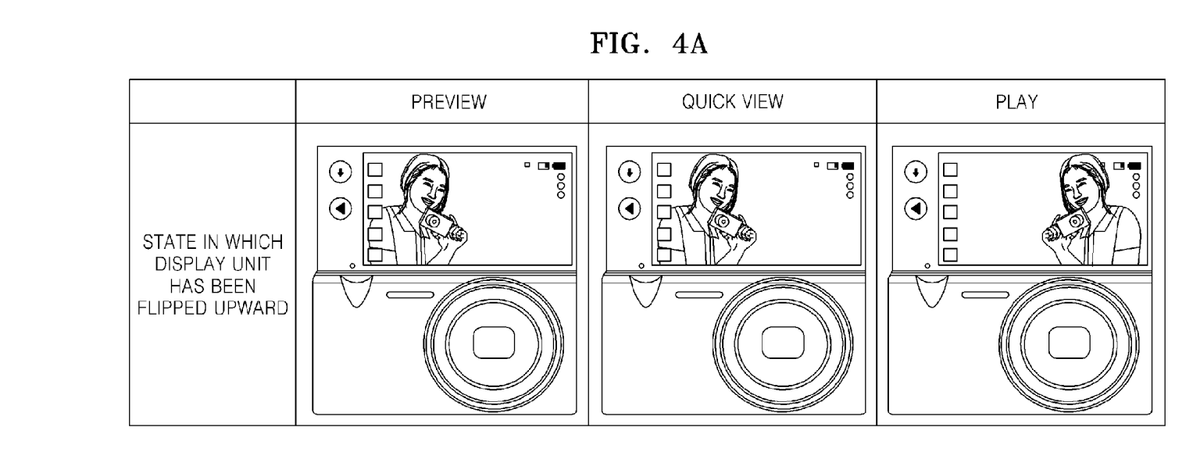
FIGS. 4A, 4B, and 4C illustrate examples of display states of a display screen of the digital camera shown in FIG. 1.
Figure 4B:
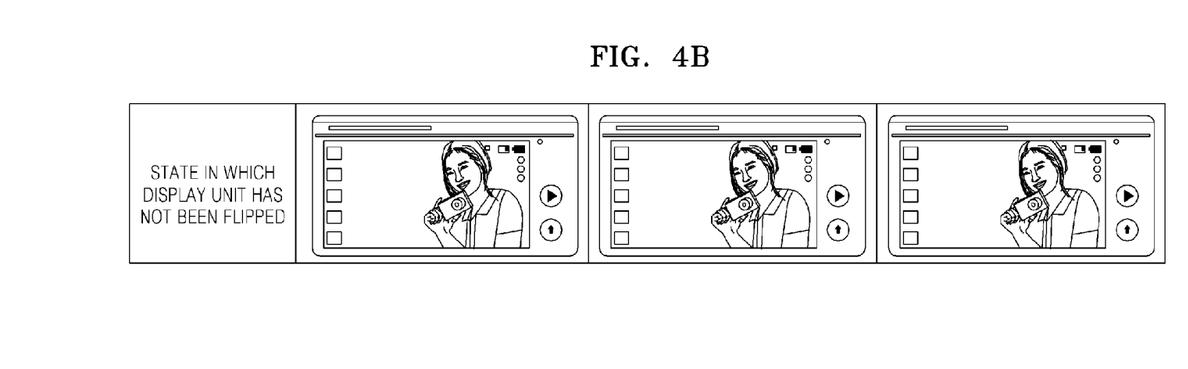
Figure 4C:
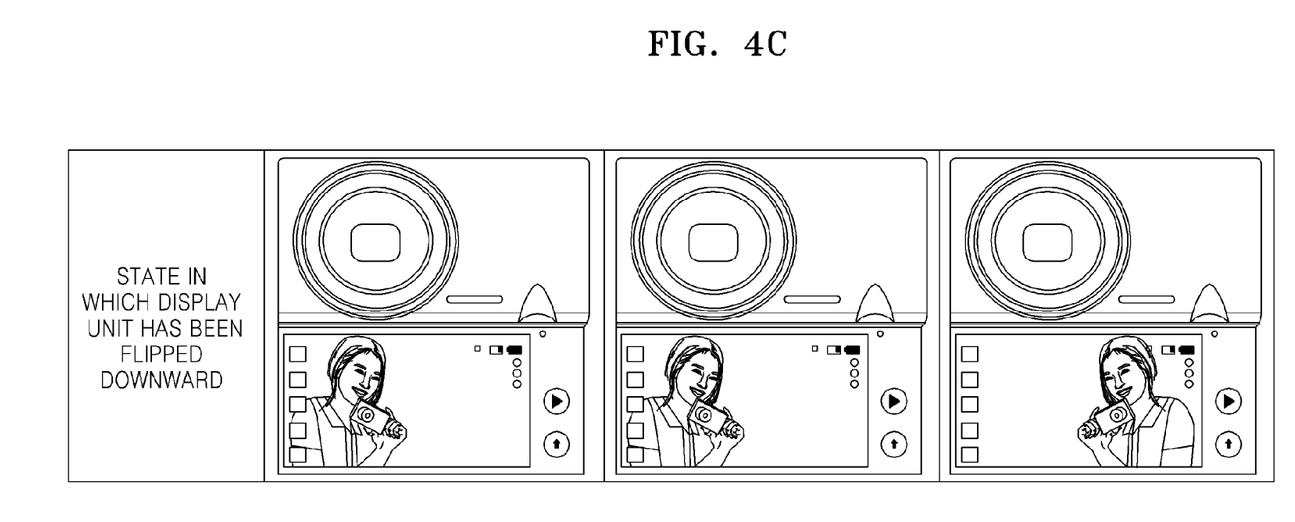

FIGS. 4A, 4B, and 4C illustrate examples of display states of the display unit 160 of the digital camera 100 of FIG. 1.

Referring to FIG. 4A, a case where the display unit 160 is flipped upward is illustrated. In this case, an image displayed on the display unit 160 is inverted from an image input via the image pickup device 115 due to the mirror effect. In other words, the image input via the image pickup device 115 does not change, but a preview image and a quick-view image are inverted.

Referring to FIG. 4B, a case where the display unit 160 is not flipped is illustrated. In this case, an image displayed on the display unit 160 is the same as an image input via the image pickup device 115.

Referring to FIG. 4C, a case where the display unit 160 is flipped downward, that is, a case where the display unit 160 is flipped upward to be over the digital camera and the digital camera 100 is then rotated by 180 degrees so that the display unit 160 is downward, as illustrated. Like the case in FIG. 4A, an image displayed on the display unit 160 is inverted from an image input via the image pickup device 115 due to the mirror effect. In this case, the image input via the image pickup device 115 is vertically inverted and accordingly is upside down relative to the image displayed on the display unit 160. Thus, when a face is detected from an input image by using a conventional front face detector, that is, by using data obtained by learning only a front face, face detection may be impossible or may require much time.

According to an embodiment of the invention, when the display unit 160 has been flipped and a subject is captured 90 degrees rotated or upside down on the image pickup device 115 due to rotation of the digital camera 100, the face of the subject may be easily and quickly detected without using an additional learning method. For example, even when the subject is captured 180 degrees rotated, the subject may be detected by using only a front face detector. In addition, when the display unit 160 of the digital camera 100 is flipped, since the coordinates of a detected face in an image displayed on the display unit 160 are different from that in an image input via the image pickup device 115 according to flipping conditions, abnormal display of face coordinates may be addressed by displaying face detection coordinates in accordance with the image displayed on the display unit 160.

Figure 2:
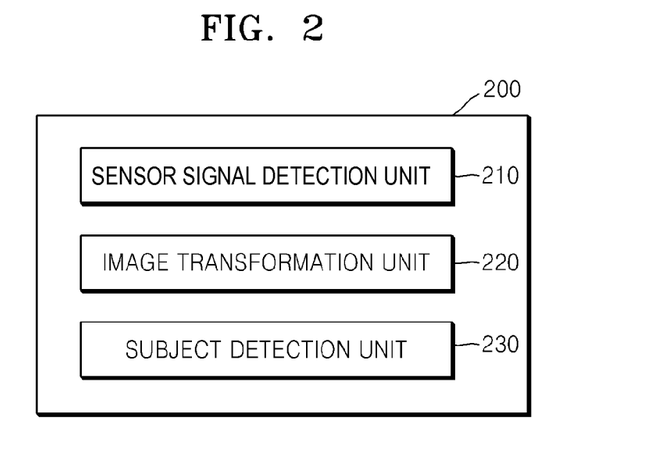
FIG. 2 is a schematic block diagram showing a digital signal processor (DSP) which is an embodiment of the DSP included in the digital camera shown in FIG. 1.

FIG. 2 is a schematic block diagram showing a DSP 200 which is an embodiment of the DSP 200 shown in FIG. 1.

Referring to FIG. 2, the DSP 200 includes a sensor signal detection unit 210, an image transformation unit 220, and a subject detection unit 230.

According to the present embodiment, the DSP 200 displays an input image and a subject detection frame showing at least a part of a subject included in the input image, on the display unit 160. Here, the input image refers to a live view image or a preview image before photographing the subject.

The subject detection frame may be a face detection frame for detecting a part of a specific subject, for example, an area of a human's face. When the digital camera 100 of which the display unit 160 has been flipped is rotated and thus the subject is captured 90 degrees rotated or upside down on the image pickup device 115, the DSP 200 may easily and quickly detect a face of the subject without using an additional learning method. In addition, since the coordinates of the detected face in the image displayed on the display unit 160 are different from that in the image input via the image pickup device 115 according to flipping conditions, abnormal display of face coordinates may be addressed by displaying face detection coordinates in accordance with the image displayed on the display unit 160.

The sensor signal detection unit 210 receives a sensing signal corresponding to the rotation state and the display state of the input image from the sensor unit 117 of FIG. 1. The rotation state of the input image denotes information regarding an angle at which the input image is inclined by rotating the digital camera 100 as illustrated in FIG. 6, for example, angle information such as 90 degrees at which the input image is inclined clockwise, 90 degrees at which the input image is inclined counter-clockwise, or 180 degrees. The display state of the input image denotes display of the input image so that the input image faces the subject. As illustrated in FIG. 5, the display state of the input image denotes display of the input image so that the input image faces the subject due to flipping of the display unit 160.

The image transformation unit 220 inverts the input image for subject detection horizontally or vertically by using pieces of information obtained from the sensor signal detection unit 210. In other words, an input image rotated 90 degrees clockwise is re-rotated 90 degrees counter clockwise, that is, is horizontally inverted and output to the subject detection unit 230, or an input image rotated 180 degrees is re-rotated 180 degrees, that is, is vertically inverted and output to the subject detection unit 230.

The subject detection unit 230 detects a subject from the input image. The subject may be the face of a person. The input image may be an image directly input via the image pickup device 115 or may be an image transformed or rotated according to the rotation state and the display state of the input image by using the image transformation unit 220. Although hereinafter the subject is assumed as a face and description is focused on face detection, other subjects may also be detected through the same learning method.

The subject detection unit 230 detects a predetermined face region from the input image. When the face region is detected, a face detection frame is displayed on the face region. Although the following description is limited to face detection, other regions of the subject may be detected. In general, in face detection, whether face data exists in an input image is determined by comparing pre-stored feature data of the face with input image data, and when it is determined that the face data exists, it is determined where image data of a face exists. There exists many face region detection techniques or algorithms, which may be used in face detection according to an embodiment of the invention. For example, a face region may be detected by using a motion vector technique, a feature point detection technique, an Adaboost learning technique, or the like.

Figure 3:
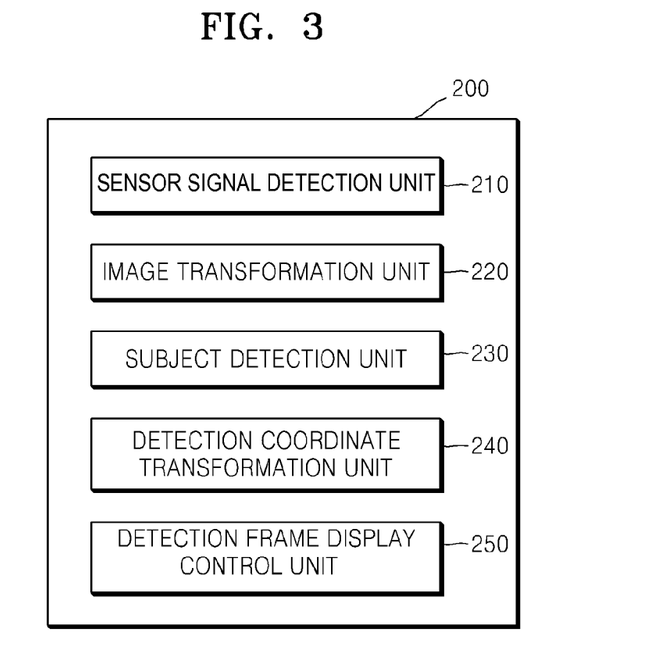
FIG. 3 is a schematic block diagram showing a DSP which is another embodiment of the DSP included in the digital camera shown in FIG. 1.

FIG. 3 is a schematic block diagram showing a DSP 200 which is another embodiment of the DSP 200 shown in FIG. 1.

Referring to FIG. 3, the DSP 200 according to the present embodiment is the same as the DSP 200 of FIG. 2 except that a detection coordinate transformation unit 240 and a detection frame display control unit 250 are further included. A description about the same elements as those of the DSP 200 of FIG. 2 will be omitted, and only the additional new elements will be described.

In addition, since the coordinates of the detected face in the image displayed on the display unit 160 is different from that in the image input via the image pickup device 115 according to flipping conditions, abnormal display of face coordinates may be addressed by displaying face detection coordinates in accordance with the image displayed on the display unit 160.

When the coordinates of a subject detected by the subject detection unit 230 is not consistent with the coordinates of a subject displayed on the display unit 160, the detection coordinate transformation unit 240 transforms the coordinates of the detected subject so that the coordinates of the detected subject conform to the displayed coordinates.

The detection frame display control unit 250 controls a detection frame to be displayed on the display unit 160 according to the transformed coordinates of the subject.

For example, when the display unit 160 has been flipped as illustrated in FIG. 5, since the image input via the image pickup device 115 is a front face image but the image displayed on the display unit 160 is an image inverted from the front face image, the coordinates of the detected subject are displayed upside down. Accordingly, in this case, the coordinates of the detected subject are vertically inverted, and the detection frame is then displayed.

FIGS. 7-10 are illustrative views for explaining subject detecting methods according to embodiments of the invention.

Figure 7:
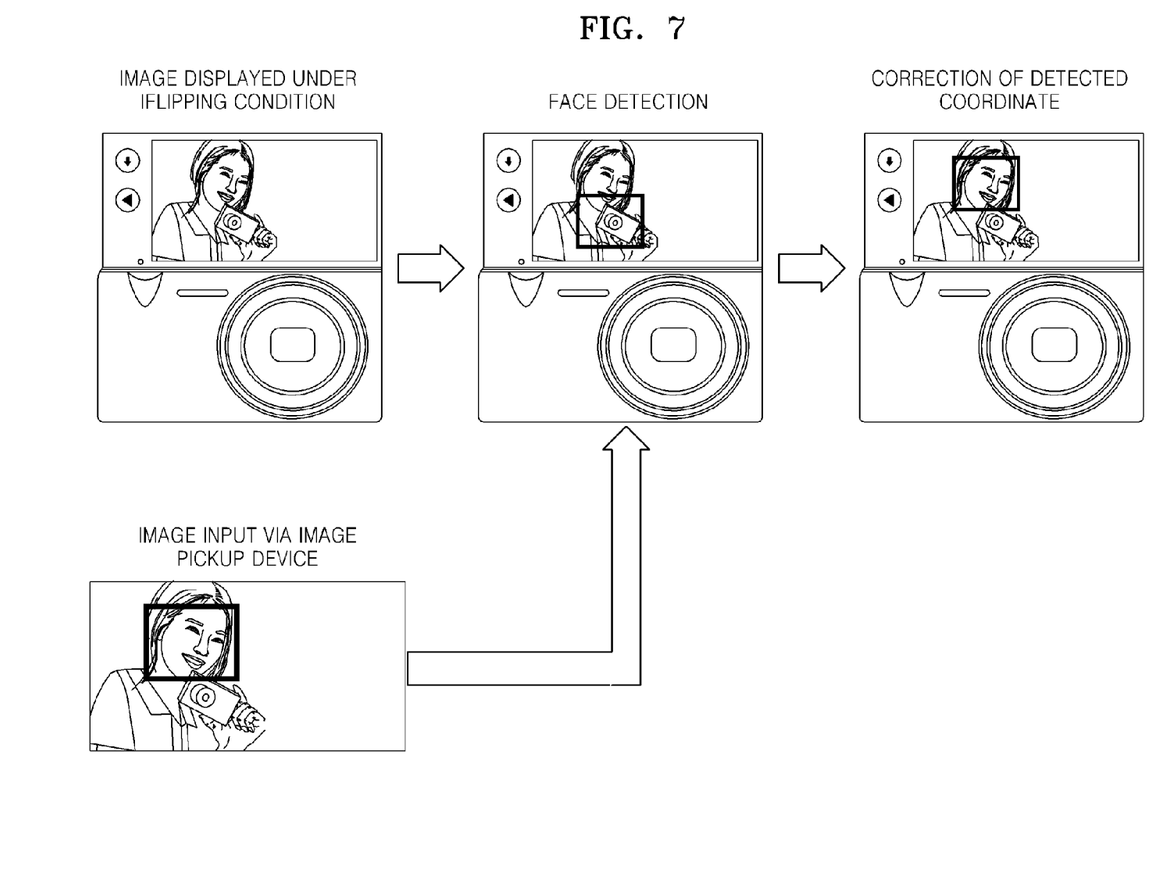
FIGS. 7-10 are illustrative views for explaining subject detecting methods, according to embodiments of the invention.

A case where an input image is not rotated when the display unit 160 has been flipped will now be described with reference to FIG. 7.

When an input image is not rotated with the display unit 160 flipped, face detection is performed on an image input via an image pickup device 115 to detect a face from the input image. However, an image displayed on the display unit 160 is vertically inverted from the image input via the image pickup device 115. Accordingly, even when a face is normally detected from the image input via the image pickup device 115, a face detection frame corresponding to the detected face is displayed on the vertically-inverted image on the display unit 160. Accordingly, in this case, the coordinates of the face detection frame corresponding to the face detected from the image input via the image pickup device 115 are vertically inverted, that is, is corrected, and thus a face detection frame with the vertically inverted coordinates is displayed on the display unit 160. The vertical inversion of the coordinates, that is, the coordinate correction, may be applied not only to the case where the display unit 160 is flipped, but also to a front display unit configured so that the display unit 160 and the image pickup device 115 exist on the same plane or the display unit 160 faces a subject.

Figure 8:
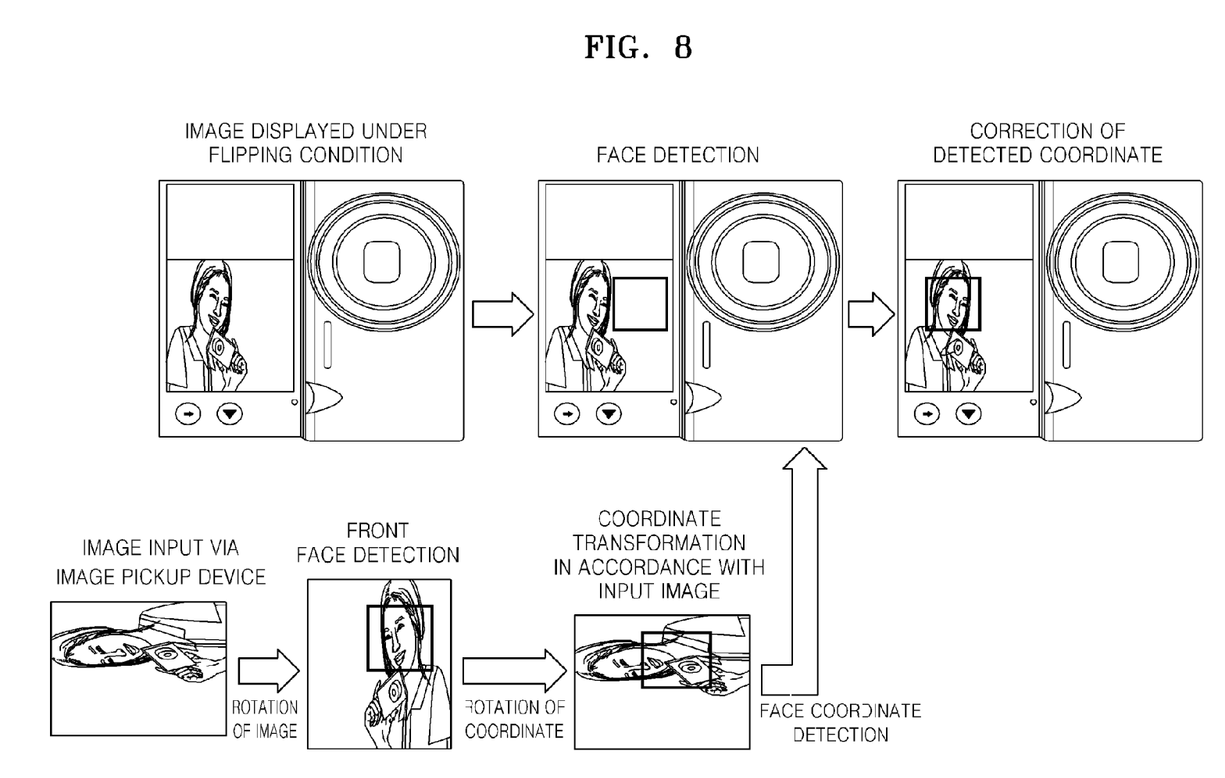

A case where an input image is rotated 90 degrees counter clockwise when the display unit 160 has been flipped will now be described with reference to FIG. 8.

When an input image has been rotated 90 degrees counter clockwise with the display unit 160 flipped, and face detection is performed on an image input via the image pickup device 115, the probability of face detection may decrease or face detection may fail. Therefore, face detection is performed after rotating the input image by 90 degrees clockwise, thereby detecting a face. An image displayed on the display unit 160 is horizontally inverted from the image input via the image pickup device 115. Accordingly, even when a face is detected after rotating the image input via the image pickup device 115, a face detection frame corresponding to the detected face is displayed on the horizontally inverted region on the display unit 160. Accordingly, in this case, the coordinates of the face detection frame corresponding to the face detected after rotating the image input via the image pickup device 115 is horizontally inverted, that is, is corrected, and thus a face detection frame with the horizontally inverted coordinates are displayed on the display unit 160. In this case, the corrected coordinates of the face detection frame corresponds to the coordinates of a face at its original position, that is, on the image input via the image pickup device 115. Although the case where an input image is rotated 90 degrees counter clockwise has been described herein, the same logic may be applied to a case where an input image is rotated 90 degrees clockwise.

Figure 9:
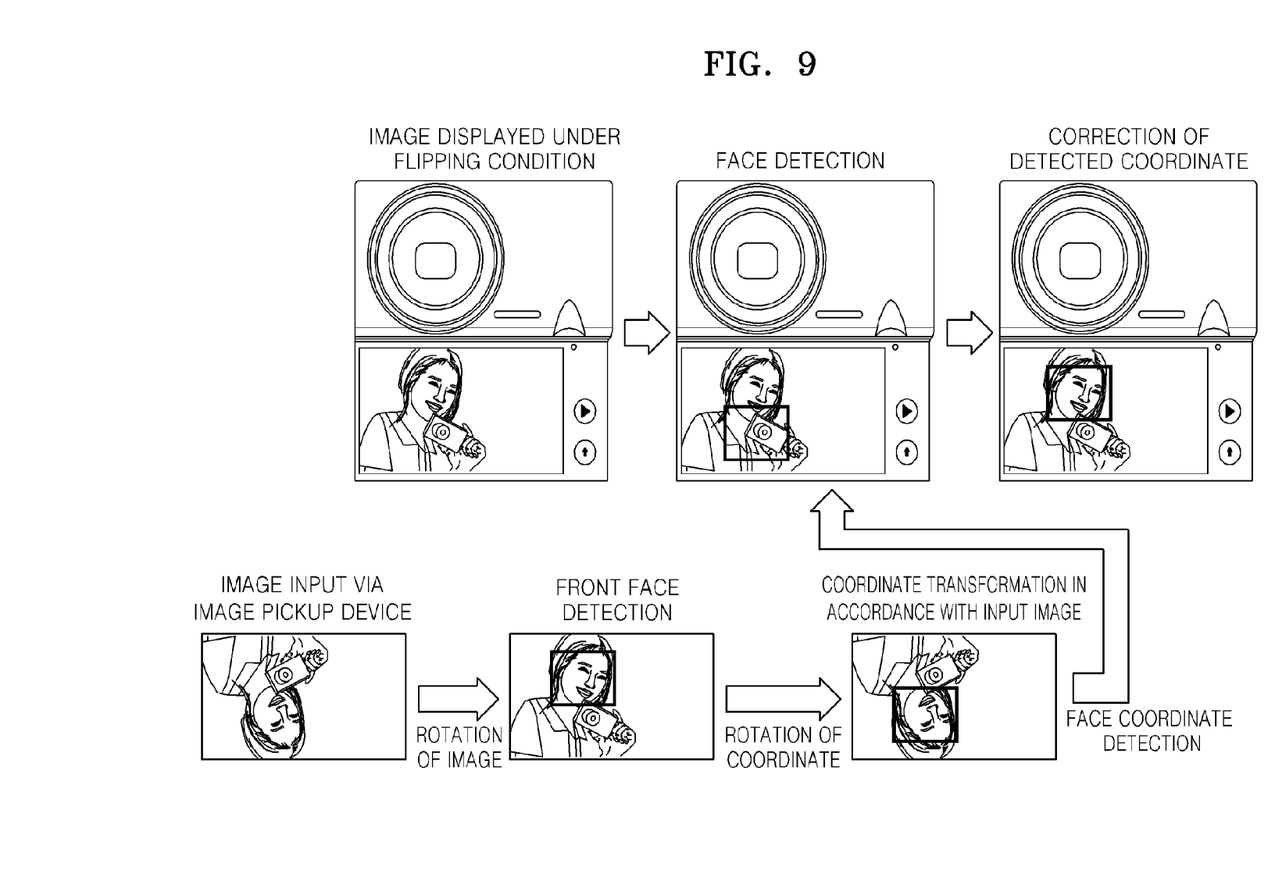

A case where an input image is rotated 180 degrees when the display unit 160 has been flipped will now be described with reference to FIG. 9.

When an input image has been rotated 180 degrees with the display unit 160 flipped, and face detection is performed on an image input via the image pickup device 115, the probability of face detection may decrease or face detection may fail. Therefore, face detection is performed after rotating the input image by 180 degrees, thereby detecting a face. An image displayed on the display unit 160 is vertically inverted from the image input via the image pickup device 115. Accordingly, even when a face is detected after rotating the image input via the image pickup device 115, a face detection frame corresponding to the detected face is displayed on the vertically inverted region on the display unit 160. Accordingly, in this case, the coordinates of the face detection frame corresponding to the face detected after rotating the image input via the image pickup device 115 are vertically inverted, that is, is corrected, and thus a face detection frame with the vertically inverted coordinates is displayed on the display unit 160. In this case, the corrected coordinates of the face detection frame corresponds to the coordinates of a face at its original position, that is, on the image input via the image pickup device 115.

Figure 10:
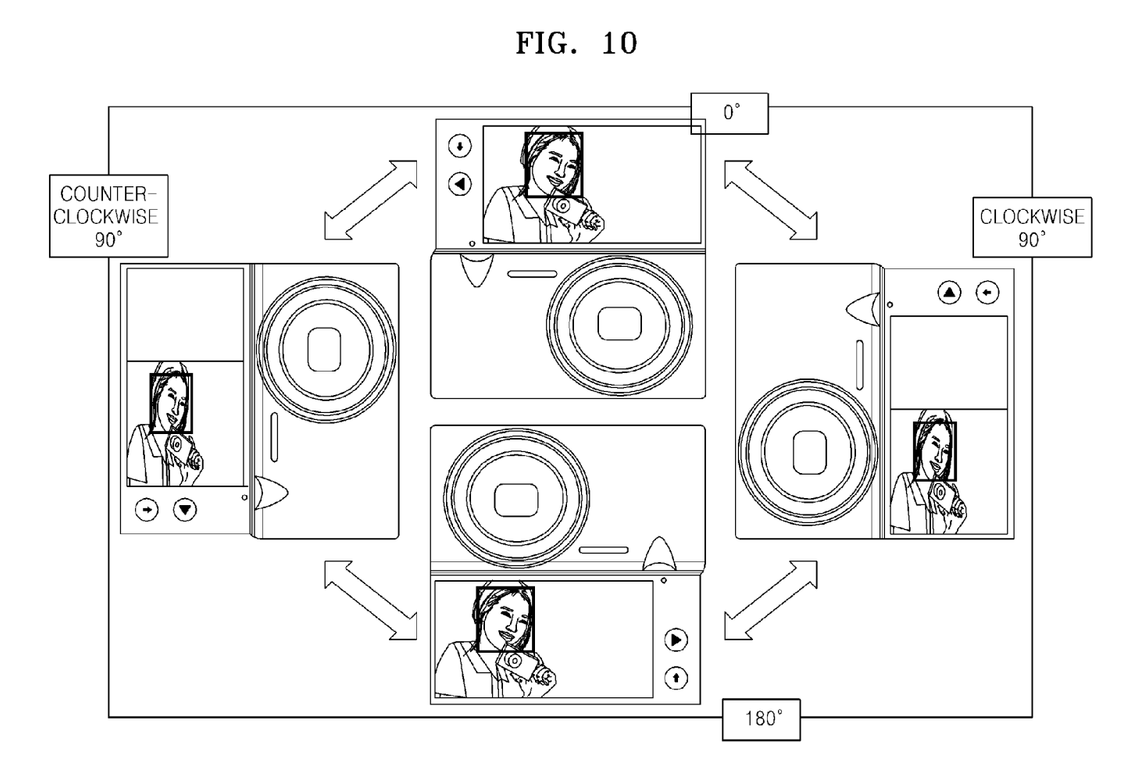

FIG. 10 illustrates displayed input images and face detection frames according to various embodiments of the invention in which a digital camera is not rotated, has been rotated 90 degrees clockwise, has been rotated 180 degrees, and has been rotated 90 degrees counter-clockwise with a display unit flipped. Although the rotation angles of 0, 90, and 180 degrees have been described herein, the rotation angles are not limited thereto, and various angles may be used. Although a case where a display unit is flipped upward has been described, the same logic may be applied to a case where the display unit is flipped downward or in any other direction.

As described above with reference to FIGS. 7-10, in a subject detecting method according to an embodiment of the invention, a digital camera with a flippable display unit may efficiently perform face detection. When an image input via an image sensor and an image displayed on the display unit are different according to rotation of the digital camera, the reliability of face detection may be increased by correcting face detection coordinates.

Figure 11:
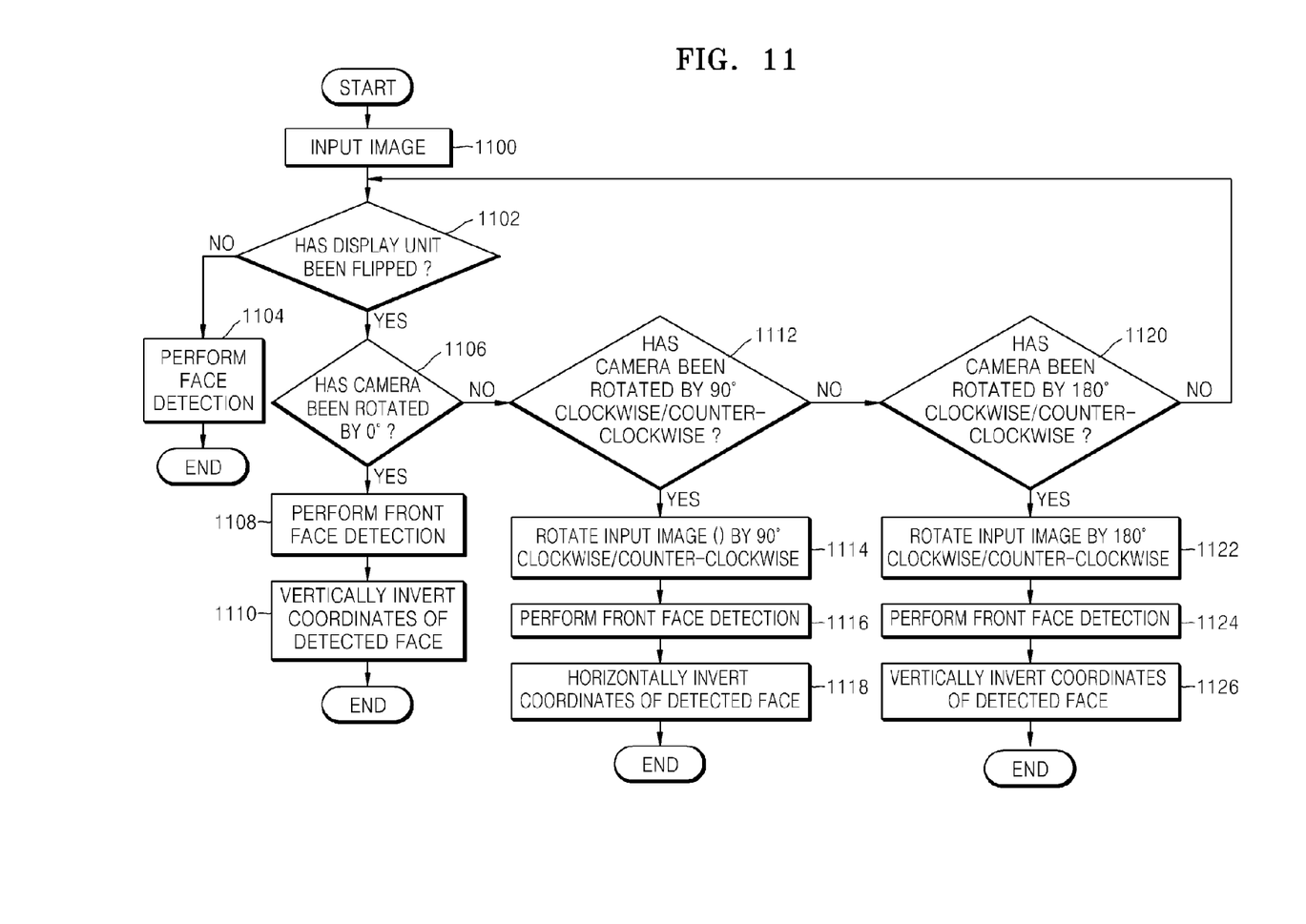
FIG. 11 is a flowchart of a subject detecting method, according to an embodiment of the invention.

FIG. 11 is a flowchart of a subject detecting method according to an embodiment of the invention.

Referring to FIG. 11, in operation 1100, an image including a subject is input via an image pickup device. In operation 1102, it is determined whether a display unit has been flipped. The determination as to whether the display unit has been flipped is made using a Hall sensor, but the determination method is not limited thereto. The displayed state of the input image may be ascertained through other methods.

When it is determined in operation 1102 that the display unit has not been flipped, face detection is performed, in operation 1104.

When it is determined in operation 1102 that the display unit has been flipped, and it is determined in operation 1106 that a camera is not rotated, front face detection is performed in operation 1108. In operation 1110, because an image displayed on the display unit is a vertically inverted image, the coordinates of a face detected in operation 1108 are vertically inverted. Although not shown, a face detection frame corresponding to the coordinates of a vertically inverted face is displayed on the display unit.

When it is determined in operation 1112 that the camera has been rotated 90 degrees clockwise/counter-clockwise, the input image is rotated 90 degrees clockwise/counter-clockwise in operation 1114, and front face detection is then performed in operation 1116. In operation 1118, since an image displayed on the display unit is a horizontally inverted image, the coordinates of a face detected in operation 1116 are horizontally inverted. Although not shown, a face detection frame corresponding to the coordinates of the horizontally inverted face is displayed on the display unit.

When it is determined in operation 1120 that the camera has been rotated 180 degrees clockwise/counter-clockwise, the input image is rotated 180 degrees clockwise/counter-clockwise in operation 1122, and front face detection is performed in operation 1124. In operation 1126, since an image displayed on the display unit is a vertically inverted image, the coordinates of a face detected in operation 1124 are vertically inverted. Although not shown, a face detection frame corresponding to the coordinates of the vertically inverted face is displayed on the display unit.

In a subject detecting method according to an embodiment of the invention, face detection may be efficiently performed in a digital photographing apparatus having a flippable display unit, and when an image input via an image sensor of the digital photographing apparatus is different from an image displayed on the display unit due to rotation of the digital photographing apparatus, face detection coordinates may be corrected to increase the reliability of face detection.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

Recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While the invention has been particularly shown and described with reference to exemplary embodiments thereof, it will be understood by those of ordinary skill in the art that various changes in form and details may be made therein without departing from the spirit and scope of this disclosure.

What is claimed is:

1. A subject detecting method comprising:
    displaying an input image on a display unit;
    detecting a subject from the input image and producing a coordinate of the detected subject;
    transforming the coordinate of the detected subject according to a rotation state of the input image and a display state of the input image; and
    displaying a subject detection frame indicating the detected subject so that the subject detection frame conforms to the transformed coordinate of the detected subject.

2. The subject detecting method of claim 1, wherein the display state denotes a state in which the input image is displayed to face the subject.

3. The subject detecting method of claim 1, wherein the rotation state of the input image comprises one of substantially 0 degrees, substantially 90 degrees, or substantially 180 degrees.

4. The subject detecting method of claim 1, wherein a coordinate of a subject included in an input image displayed on the display unit is not consistent with the coordinate of the detected subject.

5. The subject detecting method of claim 1, when the display unit has been flipped and the input image is rotated substantially 0 degrees from a reference angle, further comprising:
    vertically inverting the coordinate of the detected subject,
    wherein the subject detection frame conforms to the vertically inverted coordinate of the detected subject.

6. The subject detecting method of claim 1, wherein the input image is rotated in a direction reverse to the rotation direction according to the rotation state of the input image.

7. The subject detecting method of claim 1, when the display unit has been flipped and the input image is rotated clockwise by substantially 90 degrees from the reference angle, further comprising:
    rotating the input image substantially 90 degrees counter-clockwise;
    horizontally inverting the coordinate of the detected subject,
    wherein the subject detection frame conforms to the horizontally inverted coordinate of the subject.

8. The subject detecting method of claim 1, when the display unit has been flipped and the input image is rotated counter clockwise by substantially 90 degrees from the reference angle, further comprising:
    rotating the input image substantially 90 degrees clockwise;
    horizontally inverting the coordinate of the detected subject,
    wherein the subject detection frame conforms to the horizontally inverted coordinate of the subject.

9. The subject detecting method of claim 1, when the display unit has been flipped and the input image is rotated substantially 180 degrees from the reference angle, further comprising:
    rotating the input image substantially 180 degrees;
    vertically inverting the coordinate of the detected subject,
    wherein the subject detection conforms to the vertically inverted coordinate of the detected subject.

10. The subject detecting method of claim 1, wherein the subject is a face.

11. A non-transitory computer-readable recording medium having recorded thereon a program for executing at least the subject detecting method of claim 1.

12. A subject detecting apparatus comprising:
    a display unit which displays an input image;
    a subject detection unit which detects a subject from the input image and produces a coordinate of the detected subject,
    a detection coordinate transformation unit that transforms the coordinate of the detected subject according to a rotation state of the input image and a display state of the input image; and
    a detection frame display controller which displays a subject detection frame indicating the detected subject.

13. The subject detecting apparatus of claim 12, wherein the display state denotes a state in which the input image is displayed to face the subject.

14. The subject detecting apparatus of claim 12, wherein a coordinate of a subject included in an input image displayed on the display unit is not consistent with the coordinate of the detected subject.

15. The subject detecting apparatus of claim 12, when the display unit has been flipped and the input image is rotated substantially 0 degrees from a reference angle,
    the detection coordinate transformation unit vertically inverts the coordinate of the detected subject; and
    the detection frame display controller displays a subject detection frame that conforms to the vertically inverted coordinate of the detected subject.

16. The subject detecting apparatus of claim 12, further comprising:
    a sensor unit which senses the rotation state of the input image and the display state of the input image; and
    an image transformation unit which rotates the input image in a direction reverse to the rotation direction according to the sensed rotation state of the input image.

17. The subject detecting apparatus of claim 11, wherein the subject is a face.

18. A digital photographing apparatus comprising:
    an image pickup device which receives light from a subject to be photographed to produce an input image;
    a display screen which displays the input image;
    a sensor unit which senses a rotation state of the input image and a rotation state of the display screen;
    a digital signal processor which detects the subject and produces a coordinate of the detected subject;
    a detection coordinate transformation unit that transforms the coordinate of the detected subject according to a rotation state of the input image and a display state of the input image; and
    a detection frame display controller which displays a subject detection frame indicating the detected subject on the display screen.

19. The digital photographing apparatus of claim 18, wherein the display screen is configured to be flipped to face the subject.

20. The digital photographing apparatus of claim 18, wherein the rotation state of the input image comprises one of substantially 0 degrees, substantially 90 degrees, or substantially 180 degrees.

21. The digital photographing apparatus of claim 18, wherein a coordinate of the detected subject displayed on the display screen is not consistent with the coordinate of the detected subject.

22. The digital photographing apparatus of claim 18, wherein the sensor unit comprises:
- an acceleration sensor which senses the rotation state of the input image; and
- a Hall sensor which senses the rotation state of the display screen.

* * * * *